United States Patent

Chadwick et al.

[11] 4,199,735
[45] Apr. 22, 1980

[54] OPTICAL COMPENSATION FOR THERMAL LENSING IN CONDUCTIVELY COOLED LASER ROD

[75] Inventors: Curt H. Chadwick, Los Altos; Edward D. Reed, Sunnyvale, both of Calif.

[73] Assignee: GTE Sylvania Incorporated, Stamford, Conn.

[21] Appl. No.: 912,907

[22] Filed: Jul. 3, 1978

[51] Int. Cl.² ............................................. H01S 3/045
[52] U.S. Cl. ........................... 331/94.5 P; 331/94.5 D
[58] Field of Search .................... 331/94.5 E, 94.5 F, 331/94.5 H, 94.5 D, 94.5 P

[56] References Cited

U.S. PATENT DOCUMENTS

| | | | |
|---|---|---|---|
| 3,339,150 | 8/1967 | Bowness | 331/94.5 D |
| 3,399,359 | 8/1968 | Ott et al. | 331/94.5 P |
| 3,471,801 | 10/1969 | Woodbury et al. | 331/94.5 P |

*Primary Examiner*—William L. Sikes
*Attorney, Agent, or Firm*—John F. Lawler

[57] ABSTRACT

Thermal lensing effects in a conductively cooled optically pumped laser rod are compensated by limiting the width of thermal contact between the rod surface and its supporting heat sink to an arc width of 70° to 80° and utilizing a simple cylindrical laser cavity mirror or mirrors. This limited heat sink contact produces nearly parallel isotherms in the rod which react with the laser beam so that it may be readily focused by a cylindrical beam focusing means in the laser optical resonator.

3 Claims, 8 Drawing Figures

OPTICAL COMPENSATION FOR THERMAL LENSING IN CONDUCTIVELY COOLED LASER ROD

This invention was made under a contract with the Department of the Air Force.

CROSS REFERENCE TO RELATED APPLICATION

Application Ser. No. 866,512 filed Jan. 3, 1978 by Radecki et al.

BACKGROUND OF THE INVENTION

This invention relates to lasers and more particularly to an optically pumped laser with a rod-type lasing medium supported on a heat sink.

The patent application identified above describes an optically pumped laser in which the lasing medium is a cylindrical rod supported on the end of a heat sink within an elliptical cavity which focuses the pump light into the rod. In order to enhance the performance of the laser, it is desirable that the area of contact of the laser rod surface by the heat sink be as large as possible for cooling the rod. At the same time, it is also desirable to expose a large rod surface area to radiation from the pump lamp to obtain maximum pumping efficiency. A trade-off between these two design objectives in the assembly described in the above-identified application resulted in a width of contact between the heat sink and the laser rod of 120°.

A disadvantage of this 120° rod surface contact is the resultant distortion of the laser beam phase wavefront caused by thermal lensing effects exhibited by the rod. As a consequence, the beam wavefront profile is shaped so that it cannot be properly focused by conventionally shaped laser cavity mirrors.

This invention is directed to a uniquely simple solution to this problem.

OBJECT AND SUMMARY OF THE INVENTION

An object of this invention is to provide heat sink support for an optically pumped laser rod so that deleterious thermal lensing effects in the rod are minimized.

Another object is the provision of support of an optically pumped laser rod on a heat sink such that the beam phase wavefront is substantially cylindrically shaped and thus is readily focused by conventional cylindrical focusing means in the laser optical resonator.

These and other objects of the invention are achieved by mounting the laser rod on the end of the heat sink so that the latter contacts the rod surface over an arc width of 70° to 85°. We have discovered that such heat sink-rod surface contact produces a nearly cylindrical thermal profile on the cross section of the laser rod resulting in a similarly shaped beam wavefront that can be focused readily with conventionally shaped beam focusing means.

DESCRIPTION OF PREFERRED EMBODIMENT

Figure 1:
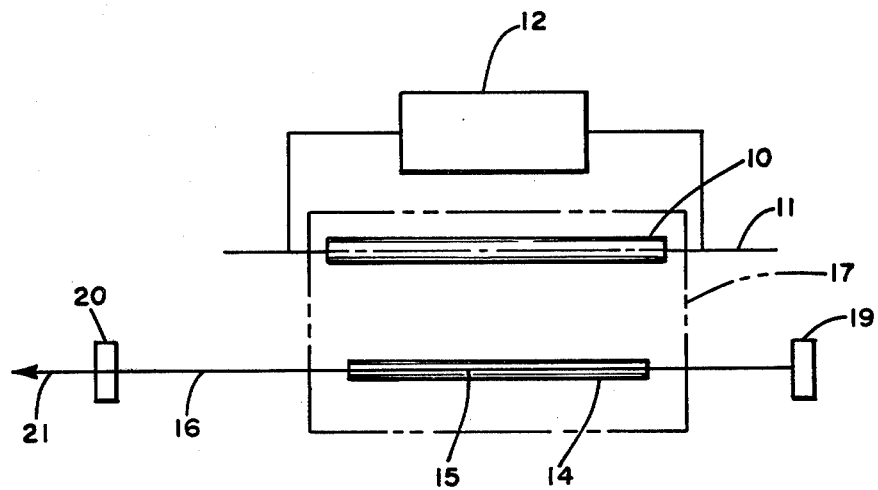
FIG. 1 is a simplified schematic drawing of a prior art laser system of the type with which this invention is practiced.

Referring now to the drawings, FIG. 1 is a schematic representation of a laser system of the type in which the invention is practiced. The system comprises a laser pump lamp 10 having an axis 11 and energized by a power supply 12. Lamp 10, which may be of the alkali-metal type, illuminates and optically pumps a rod 14 of lasing material, such as neodymium-doped yttrium aluminum garnet (Nd:YAG), having an axis 15, essentially along which the coherent light 16 is generated. Lamp 10 and laser rod 14 are mounted within a pumping assembly indicated in broken lines at 17. Coherent light 16 generated by the lasing action in rod 14 is reflected by a highly reflecting mirror 19 and a partially reflecting mirror 20, which define the laser optical resonator. The output 21 from mirror 20 typically has a wavelength of 1.064 $\mu$m and constitutes the useful output from the laser.

Figure 2:
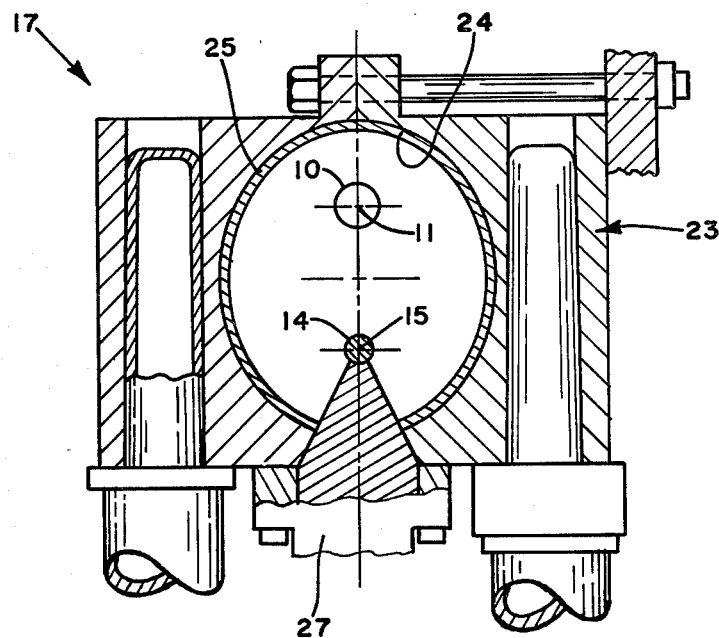
FIG. 2 is a transverse section of a laser assembly embodying this invention.

Assembly 17 is shown in FIG. 2 and comprises a split conductively cooled housing 23 having an elliptical pump cavity 24 containing a liner 25 which is adapted to reflect light in the band of wavelengths which optically pumps rod 14. Rod 14 is supported on the tapered end of the heat sink 27 such that the axis 15 of the rod is essentially coincident with one axis of the pump 24 cavity. Lamp 10 is supported with its axis 11 essentially coincident with the other axis of the cavity so that light radiating from the lamp is reflected by liner 25 toward rod 14.

Figure 3:
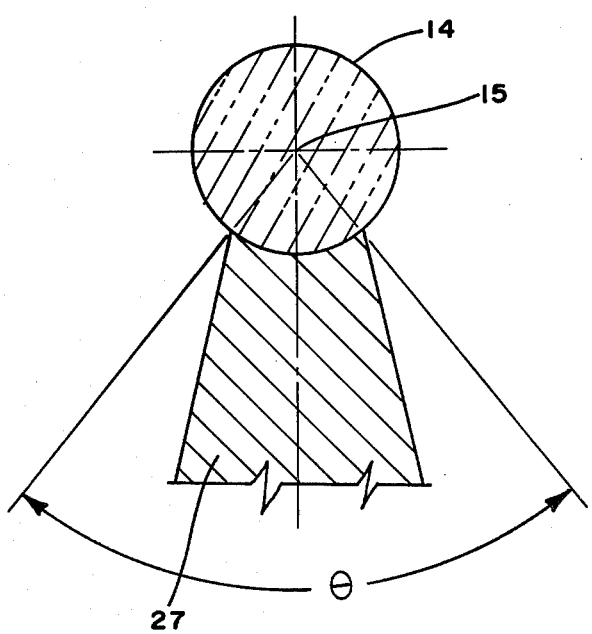
FIG. 3 is a greatly enlarged view of the laser rod and heat sink portion of FIG. 2.

Heat sink 27 engages the underside of rod 14 over a portion of its surface having an arc width of $\theta$, see FIG. 3. The magnitude of arc $\theta$ is significant in determining the operating efficiency of the laser. Maximum exposure of the rod surface to light rays from the lamp is achieved by minimizing the size of arc $\theta$ while rod cooling efficiency is improved by increasing the contact arc width. A compromise of these two design considerations in the past has resulted in a contact arc $\theta$ equal to 120°.

The foregoing design considerations for supporting the rod on the heat sink does not take into account lensing and birefringence effects in the rod due to internal temperature gradients. These thermal effects consist of a focusing of the laser beam due to the refractive index variation with temperature, focusing due to thermal strains, and focusing due to thermal distortion of the rod ends. Thermal lensing resulting from a 120° contact arc so focuses the laser beam that the lensing effect cannot be adequately compensated by conventional laser optics. Such beam defocusing is better understood by reference to FIGS. 4 and 5 which illustrate the distribution of isotherms over the cross section of the laser rod. The inner dotted line circle 29 in FIGS. 4–7, inclusive, represent the portion of the rod through which the laser beam is transmitted.

Figure 4:
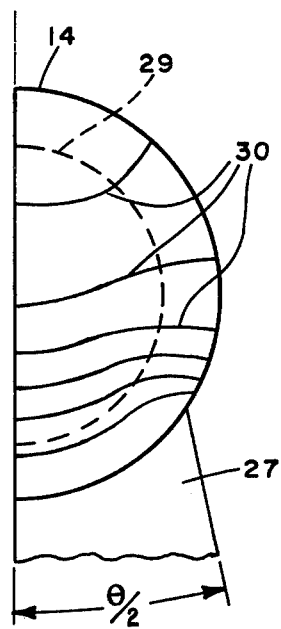
FIG. 4 is a schematic view of one half of a laser rod cross section showing isothermal lines for a 120° heat sink contact arc.
Figure 5:
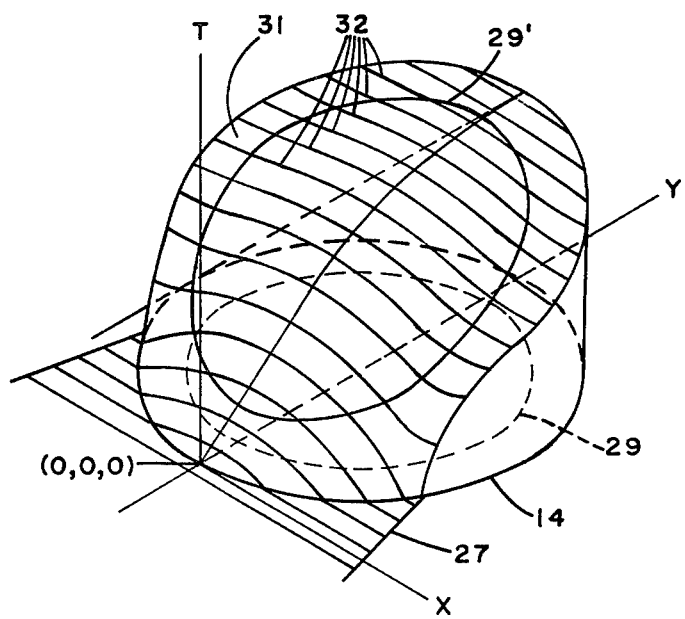
FIG. 5 is a schematic representation of the thermal surface of a rod for a 120° heat sink contact arc.

As shown in FIG. 4, the isotherms 30 are curved upwardly within circle 29 as shown because of the length of the heat sink contact arc, i.e., 120° in FIG. 4. This isothermal line distribution is shown in three dimensions in FIG. 5 which illustrates the temperature T plotted against X and Y cartesian coordinates located in the plane of the rod cross section resulting in the imaginary thermal surface 31. It will be noted that isothermal lines 32 within the projected outline 29' of circle 29 define a three-dimensional bulge having a complex configuration. The shape of thermal surface 31 corresponds to the shape of the phase wavefront of the laser beam passing through the rod, which wavefront, because of its complex shape, is difficult to focus with conventionally shaped laser cavity mirrors.

Figure 6:
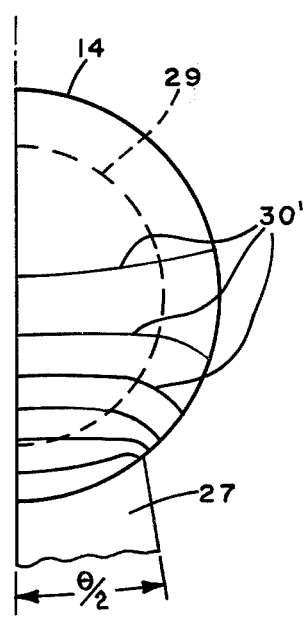
FIG. 6 is a view similar to FIG. 4 for a heat sink contact arc of 80° in accordance with this invention.
Figure 7:
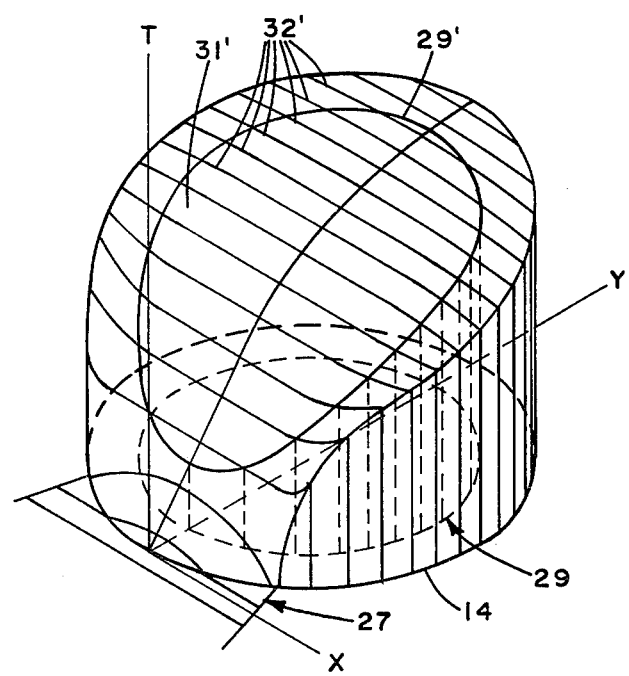
FIG. 7 is a view similar to FIG. 5 for a rod surface contact arc of 80°.

In accordance with this invention, we have discovered that by reducing the arc width of heat sink contact with the rod to a value with the range of 70° to 85°, the heat flow pattern in the rod is altered so as to substantially overcome this problem. Specifically, thermal rod focusing of the laser beam under these conditions produces a beam phase wavefront that is approximately cylindrical, so as to be readily intercepted and reflected back on itself by an inversely shaped mirror, as is required in an optical resonator. This is illustrated in FIGS. 6 and 7 for a heat sink-rod contact arc $\theta$ of 80°. It will be noted in FIG. 6 that the isothermal lines 30' are substantially horizontal within the beam circle 29 and that the thermal surface 31' shown in FIG. 7 is substantially cylindrical. The phase wavefront of the beam passing out of the rod end is thus nearly cylindrical as indicated at 33 in FIG. 8 and is readily reflected back on itself with little change in shape by reflection from cavity mirror 19' having a cylindrical reflecting surface 34 with an axis of formation extending perpendicular to the plane containing the axes of the lamp and rod.

Figure 8:
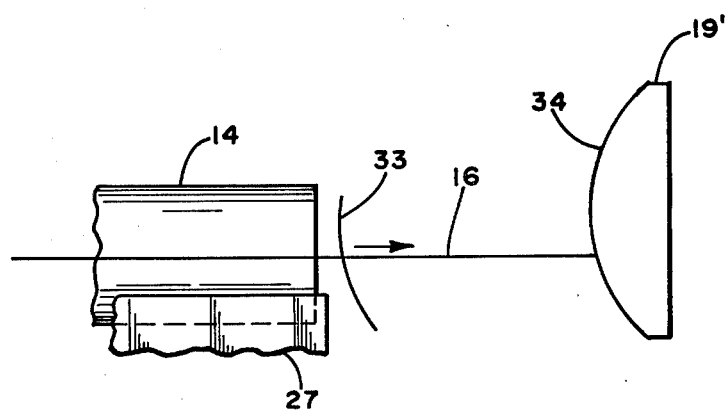
FIG. 8 is a schematic view of one end of the laser rod and the adjacent cavity mirror illustrating the principle of operation of the invention.

This description of the operation of mirror 19' in FIG. 8 assumes a spherical shape for the beam phase wavefront in the region of the optical resonator between rod 14 and mirror 20 of FIG. 1. In this case, mirror 20 would be of spherical shape, or flat. Other combinations of cylindrical optics are possible, including having both mirrors 19' and 20 cylindrical, mirror 20 cylindrical and mirror 19' spherical, or both mirrors spherical and either inserting a cylindrical lens between the mirrors of the optical resonator or providing a cylindrical surface on either or both ends of the laser rod. Thus, the invention contemplates a heat sink-rod engagement arc of 70°–85° together with cylindrical focusing means in or forming part of the laser cavity.

What is claimed is:

1. In laser apparatus comprising a housing having an elliptical bore with first and second focal axes, a pump lamp having an axis approximately coincident with said first axis, means for supporting said lamp in said bore, means to energize said lamp, a cylindrical laser rod having an axis approximately coincident with said second axis and disposed within said bore spaced from and parallel to said lamp whereby said lamp pumps said rod for producing a laser beam essentially along the axis of the rod, the improvement comprising
    means for supporting said rod comprising
        a heat conductive body having one end extending into said bore and the opposite end projecting outside said housing,
        said body making heat conductive engagement with the exterior of said rod over an arc not greater than 85° and not less than 70°,
    reflecting means in the path of said laser beam on opposite ends of said rod defining the laser optical resonator, and
    cylindrical beam focusing means within said laser resonator.

2. Laser apparatus according to claim 1 in which said reflecting means comprises a pair of mirrors, at least one of said mirrors having a cylindrical reflecting surface facing said rod and constituting said beam focusing means, said cylindrical surface having an axis of formation extending perpendicular to the plane containing the axes of said lamp and said rod.

3. The apparatus according to claim 1 in which said arc of engagement of said body with said rod is approximately 80°.

* * * * *